US008699583B2

(12) United States Patent
Hannuksela et al.

(10) Patent No.: US 8,699,583 B2
(45) Date of Patent: Apr. 15, 2014

(54) SCALABLE VIDEO CODING AND DECODING

(75) Inventors: Miska Hannuksela, Ruutana (FI); Ye-Kui Wang, Tampere (FI)

(73) Assignee: Nokia Corporation, Espoo (FI)

( * ) Notice: Subject to any disclaimer, the term of this patent is extended or adjusted under 35 U.S.C. 154(b) by 1944 days.

(21) Appl. No.: 11/736,492

(22) Filed: Apr. 17, 2007

(65) Prior Publication Data
US 2008/0013620 A1 Jan. 17, 2008

Related U.S. Application Data

(60) Provisional application No. 60/830,358, filed on Jul. 11, 2006.

(51) Int. Cl.
*H04N 7/12* (2006.01)
*H04N 7/32* (2006.01)

(52) U.S. Cl.
USPC ............................ 375/240.26; 375/240.12

(58) Field of Classification Search
USPC ................................ 375/240.26, 240.12
See application file for complete search history.

(56) References Cited

U.S. PATENT DOCUMENTS

| | | | | |
|---|---|---|---|---|
| 6,920,486 | B2 * | 7/2005 | Kiiskinen ..................... | 709/214 |
| 2003/0067637 | A1 * | 4/2003 | Hannuksela ................. | 358/504 |
| 2003/0138043 | A1 * | 7/2003 | Hannuksela ............. | 375/240.08 |
| 2003/0163477 | A1 * | 8/2003 | Visharam et al. ............ | 707/100 |
| 2003/0169627 | A1 * | 9/2003 | Liu ............................... | 365/200 |
| 2004/0006575 | A1 | 1/2004 | Visharam et al. | |
| 2004/0139462 | A1 * | 7/2004 | Hannuksela et al. ........... | 725/32 |
| 2004/0179598 | A1 * | 9/2004 | Zhou et al. ................ | 375/240.11 |
| 2005/0175098 | A1 | 8/2005 | Narasimhan et al. | |
| 2006/0015792 | A1 * | 1/2006 | Vitali et al. .................... | 714/758 |
| 2006/0026646 | A1 * | 2/2006 | Lou et al. ......................... | 725/52 |
| 2006/0088107 | A1 * | 4/2006 | Cancemi et al. ......... | 375/240.27 |
| 2007/0014346 | A1 * | 1/2007 | Wang et al. ................ | 375/240.1 |
| 2007/0016594 | A1 * | 1/2007 | Visharam et al. ............. | 707/100 |

FOREIGN PATENT DOCUMENTS

| | | | | |
|---|---|---|---|---|
| JP | WO2005106875 | * 11/2005 | ............. | G11B 27/00 |
| WO | WO 2005/074295 | 8/2005 | | |
| WO | WO 2007/042916 | 4/2007 | | |

OTHER PUBLICATIONS

Ye-Kui Wang, Miska M. Hannuksela, Joint Video Team (JVT) of ISO/IEC MPEG & ITU-T VCEG (ISO/IEC JTC1/SC29/WG11 and ITU-T SG16 Q.6) 16th Meeting: Poznan, Poland, Jul. 24-29, 2005, JVT-P061 Signaling of scalability information.pdf.*

Office Action for Chinese Patent Application No. 200780033072.4, dated Jul. 13, 2011.

English translation of Office Action for Chinese Patent Application No. 200780033072.4, dated Jul. 13, 2011.

(Continued)

*Primary Examiner* — Saleh Najjar
*Assistant Examiner* — Shu Chun Gao
(74) *Attorney, Agent, or Firm* — Alston & Bird LLP

(57) ABSTRACT

A system and method for conveying supplemental enhancement information related to different pictures in one access unit. Different pictures in one access unit may be pictures of each layer of a scalable video, pictures of each view of a multiview video, or pictures of each description in a multiple description coding (MDC) video. An indication is included in the coded bitstream indicating the pictures with which the supplemental enhancement information message is associated. During a subsequent decoding process, the device performing the decoding recognizes this information and uses it appropriately.

42 Claims, 5 Drawing Sheets

(56) References Cited

OTHER PUBLICATIONS

International Search Report for PCT Application No. PCT/IB2007/052752.
Office Action for Korean Patent Application No. 10-2009-7002415, dated Jul. 15, 2010.
English translation of Office Action for Korean Patent Application No. 10-2009-7002415, dated Jul. 15, 2010.
Supplementary European Search Report for PCT Application No. PCT/IB200702752, dated Mar. 24, 2010.
JVT: "Joint Draft 6: Scalable Video Coding", Joint Video Team (JVT) of ISO/IEC MPEG & ITU-T VCEG(ISO/IEC JTC1/SC29/WG11 and ITU-T SG16 Q6), JVT-S201, Apr. 2006.
Hannuksela, M. M. et al, "Scope of SEI messages" Joint Video Team (JVT) of ISO/IEC MPEG & ITU-T VCEG(ISO/IEC JTC1/SC29/WG11 and ITU-T SG16 Q6), JVT-T073, Jul. 2006.
Ens-Rainer, Ohm et al., "SVC Requirements Specified by MPEG (ISO.IEC JC 1 / SC 29 / WG 11)", Joint Video Team (JVT) of ISO/IEC MPEG & ITU-T VCEG(ISO/IEC JTC1/SC29/WG11 and ITU-T SG16 Q6), JVT-NO26, Apr. 2005.

\* cited by examiner

SCALABLE VIDEO CODING AND DECODING

CROSS-REFERENCE TO RELATED APPLICATIONS

The present application claims priority to U.S. Provisional Patent Application No. 60/830,358, filed Jul. 11, 2006.

FIELD OF THE INVENTION

The present invention relates generally to Scalable Video Coding and Decoding. More particularly, the present invention relates to the use of Supplemental Enhancement Information messages in Scalable Video Coding and Decoding.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Multimedia applications include local playback, streaming or on-demand, conversational and broadcast/multicast services. Technologies involved in multimedia applications include, among others, media coding, storage and transmission. Different standards have been specified for different technologies.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC). In addition, there are currently efforts underway with regards to the development of new video coding standards. One such standard under development is the scalable video coding (SVC) standard, which will become the scalable extension to the H.264/AVC standard (H.264/AVC). Another such effort involves the development of China video coding standards. Another such standard under development is the multi-view video coding (MVC) standard, which will become another extension to H.264/AVC.

SVC can provide scalable video bitstreams. In SVC, a video sequence can be coded in multiple layers, and each layer is one representation of the video sequence at a certain spatial resolution or temporal resolution or at a certain quality level or some combination of the three. A portion of a scalable video bitstream can be extracted and decoded at a desired spatial resolution, temporal resolution, a certain quality level or some combination of these resolutions. A scalable video bitstream contains a non-scalable base layer and one or more enhancement layers. An enhancement layer may enhance the temporal resolution (i.e. the frame rate), the spatial resolution, or simply the quality of the video content represented by the lower layer or part thereof. In some cases, data of an enhancement layer can be truncated after a certain location, even at arbitrary positions, and each truncation position can include some additional data representing increasingly enhanced visual quality. Such scalability is referred to as fine-grained (granularity) scalability (FGS). In contrast to FGS, the scalability provided by a quality enhancement layer that does not provide fined-grained scalability is referred to as coarse-grained scalability (CGS). Base layers can be designed to be FGS scalable as well. SVC is one example of scalable coding of video. A draft of the SVC standard is described in JVT-S202, "Joint Scalable Video Model JSVM-6: Joint Draft 6 with proposed changes," 19th JVT Meeting, Geneva, Switzerland, April 2006.

In multiple description coding (MDC), an input media sequence is encoded into more than one sub-stream, each of which is referred to as a description. Each description is independently decodable and represents a certain media quality. However, based on the decoding of one or more descriptions, additional decoding of another description can result in an improved media quality. MDC is discussed in detail in Y. Wang, A. Reibman, and S. Lin, "Multiple description coding for video delivery," Proceedings of the IEEE, vol. 93, no. 1, January 2005.

In multi-view video coding, video sequences output from different cameras, each corresponding to a view, are encoded into one bitstream. After decoding, to display a certain view, the decoded pictures belong to that view are displayed. A draft of the MVC standard is described in JVT-T208, "Joint multiview video model (JMVM 1.0)," $20^{th}$ JVT meeting, Klagenfurt, Austria, July 2006.

The H.264/AVC standard and its extensions include the support of supplemental enhancement information (SEI) signaling through SEI messages. SEI messages are not required by the decoding process to generate correct sample values in output pictures. Rather, they are helpful for other purposes, e.g., error resilience and display. H.264/AVC contains the syntax and semantics for the specified SEI messages, but no process for handling the messages in the recipient is defined. Consequently, encoders are required to follow the H.264/AVC standard when they create SEI messages, and decoders conforming to the H.264/AVC standard are not required to process SEI messages for output order conformance. One of the reasons to include the syntax and semantics of SEI messages in H.264/AVC is to allow system specifications, such as 3GPP multimedia specifications and DVB specifications, to interpret the supplemental information identically and hence interoperate. It is intended that system specifications can require the use of particular SEI messages both in encoding end and in decoding end, and the process for handling SEI messages in the recipient may be specified for the application in a system specification.

The mechanism for providing temporal scalability in the latest SVC specification is referred to as the "hierarchical B pictures" coding structure. This feature is fully supported by H.264/AVC, and the signaling portion can be performed by using sub-sequence-related SEI messages.

The SELI messages in H.264/AVC are described without any references to the scalable extension annex. Consequently H.264/AVC encoders generate and H.264/AVC decoders interpret the messages as described and suggested by the semantics of the messages in the H.264/AVC standard, respectively,and the messages cannot be used as such for signaling the properties of pictures above the base layer in an SVC bitstream. The access units and pictures to which H.264/AVC SEI messages pertain are specified in the semantics of each SEI message. For example, the information in a sub-sequence layer information SEI message is valid from the access unit that contains the SEI message until the next access unit containing a sub-sequence layer information SEI message, exclusive, or the end of the bitstream if no succeeding sub-sequence layer information SEI message is present. The pan-scan rectangle SEI message contains a syntax element (pan_scan_rect_repetition_period), specifying for which pictures the message is valid. The sub-sequence information SEI message contains data that is valid only for the access unit that contains it.

An access unit according to the H.264/AVC coding standard comprises zero or more SEI messages, one primary coded picture, zero or more redundant coded pictures, and zero or more auxiliary coded pictures. In some systems, detection of access unit boundaries can be simplified by inserting an access unit delimiter into the bitstream. An access unit according to SVC comprises at least one coded picture that is not a redundant or auxiliary coded picture. For example, an SVC access unit may comprise one primary coded picture for the base layer and multiple enhancement coded pictures. A coded picture as described herein refers to all of the network abstraction layer (NAL) units within an access unit having particular values of dependency_id and quality_level.

There are a number of different possibilities for the scope of an SEI message. When an SEI message contains data that pertain to more than one access unit (for example, when the SEI message has a coded video sequence as its scope), it is contained in the first access unit to which it applies. SEI messages that contain data which pertain to a single access unit, such as scene information, stereo video, etc, equally apply for all of the pictures in the access unit. An SEI message may relate to filler data, user data, etc. and not be associated to any particular access unit.

In scalable video coding, multiple description coding, multiview video coding, and other video coding methods, an access unit may comprise multiple coded pictures, wherein each picture is one representation of the video sequence or sequences at a certain spatial resolution, temporal resolution, certain quality level, view, description or some combination thereof. In certain applications, for example, it may be desirable to apply the method of pan and scan only to the pictures with the same picture size so that they can be shown on one type of display while a different type of pan and scan may be desired at a different picture size. In this situation, it would be desirable to have a mechanism for specifying which pictures within an access unit a particular SEI message applies to. For example, it would be helpful to have a mechanism for specifying a pan-scan rectangle for each picture size present in an access unit and have as many reference picture marking repetition SEI messages as needed to represent each possibility for memory management control operations.

Lastly, the semantics of an SEI message according to the H.264/AVC standard may apply only to the AVC picture (e.g., the base layer picture in SVC) in the access unit. In this situation, it may be desirable to extend the scope and semantics of the SEI message to any other picture in the access unit. This is the case for SEI messages indicating items such as spare pictures, sub-sequence layer characteristics, sub-sequence characteristics, motion-constrained slice group sets, film grain characteristics, deblocking filter display preferences, etc. For example, the current semantics of the statistical data in sub-sequence layer characteristics and sub-sequence characteristics are for the H.264/AVC base layer only, but similar statistics could also be meaningful for pictures with particular values of dependency_id and quality_level. In another example, the indicated spare picture is sufficient for the base layer, but when the picture quality improves in enhancement layers, the corresponding picture in an enhancement layer may not be sufficient as a spare picture.

SUMMARY OF THE INVENTION

Various embodiments of the present invention provide systems and methods for conveying supplemental enhancement information related to encoded pictures in one access unit. In particular, the encoded pictures in one access unit may be pictures of each layer of a scalable video, pictures of each view of a multiview video, or pictures of each description in a multiple description coding (MDC) video. The system and method of various embodiments involves an indication in the coded bitstream indicating the pictures with which the supplemental enhancement information message is associated. The description herein is provided in terms of various embodiments using H264/AVC SEI messages as examples, with the addition of syntax and semantics that are used specifically for this purpose, with the appropriate syntax being added during the encoding process. During a subsequent decoding process, the device performing the decoding recognizes this information and uses it appropriately. The system and method enable the reuse of H.264/AVC SEI messages for scalability layers, views and/or MDC descriptions, with minor additions in the semantics of the messages.

Various embodiments of the present invention also provide a system and method for conveying supplemental enhancement information related to pictures of each layer of a scalable video, redundant coded pictures or auxiliary coded pictures in the coded bitstream. The system and method involves an indication in the coded bitstream indicating the pictures of a scalable video with which the supplemental enhancement information message is associated.

Various embodiments of the present invention comprise a method, computer program product and apparatus for encoding video into an encoded video bitstream. After a plurality of pictures are encoded into an access unit, a first indication associated with the access unit is encoded. At least one message associated with the first indication is then encoded. The first indication indicates which encoded pictures in the access unit the at least one message applies to.

Other embodiments of the present invention comprise a method, computer program product and apparatus for decoding video from an encoded video bitstream. Before encoding, during encoding, or after encoding a first indication associated with an access unit is decoded, at least one message associated with the first indication is decoded. The first indication indicates which of an encoded plurality of pictures in the access unit the at least one message applies to.

The plurality of pictures from the access unit are then processed from the bitstream in accordance with the decoded first indication.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE PREFERRED EMBODIMENTS

Various embodiments of the present invention provide systems and methods for conveying supplemental enhancement information related to encoded pictures in one access unit. In particular, the encoded pictures in one access unit may be pictures of each layer of a scalable video, pictures of each view of a multiview video, or pictures of each description in a multiple description coding (MDC) video. The system and method of various embodiments involves an indication in the coded bitstream indicating the pictures with which the supplemental enhancement information message is associated. The description herein is provided in terms various embodiments using H264/AVC SEI messages as examples, with the addition of syntax and semantics that are used specifically for this purpose, with the appropriate syntax being added during the encoding process. During a subsequent decoding process, the device performing the decoding recognizes this information and uses it appropriately. The system and method enables the reuse of H.264/AVC SEI messages for scalability layers, views and/or MDC descriptions, with minor additions in the semantics of the messages.

Various embodiments of the present invention also provide a system and method for conveying supplemental enhancement information related to pictures of each layer of a scalable video, redundant coded pictures or auxiliary coded pictures in the coded bitstream. The system and method involves an indication in the coded bitstream indicating the pictures of a scalable video with which the supplemental enhancement information message is associated.

Figure 1:
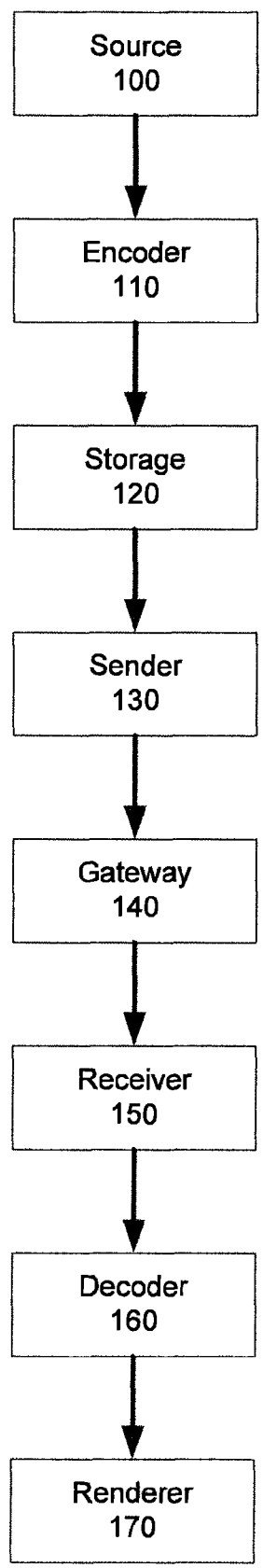
FIG. 1 shows a generic multimedia communications system for use with the present invention.

FIG. 1 shows a generic multimedia communications system for use with the present invention. As shown in FIG. 1, a data source 100 provides a source signal in an analog, uncompressed digital, or compressed digital format, or any combination of these formats. An encoder 110 encodes the source signal into a coded media bitstream. The encoder 110 may be capable of encoding more than one media type, such as audio and video, or more than one encoder 110 may be required to code different media types of the source signal. The encoder 110 may also get synthetically produced input, such as graphics and text, or it may be capable of producing coded bitstreams of synthetic media. In the following, only processing of one coded media bitstream of one media type is considered to simplify the description. It should be noted, however, that typically real-time broadcast services comprise several streams (typically at least one audio, video and text sub-titling stream). It should also be noted that the system may include many encoders, but in the following only one encoder 110 is considered to simplify the description without a lack of generality.

Some systems also include an editor (not shown in FIG. 1) that receives the coded bitstream as input from the storage 120 and writes the result of the editing operations back to the storage 120. The editor modifies the coded media bitstream by removing and/or inserting data elements. For example, the editor may remove access units for which the temporal_level is higher than a determined threshold.

Supplemental information may be generated either in the encoder 110 (during the encoding process of the video sequence) or in the editor (during an "editing" process of the coded video). For example, the pan-and-scan information may be generated after the encoding process.

The coded media bitstream is transferred to a storage 120. The storage 120 may comprise any type of mass memory to store the coded media bitstream. The format of the coded media bitstream in the storage 120 may be an elementary self-contained bitstream format, or one or more coded media bitstreams may be encapsulated into a container file. Some systems operate "live", i.e. omit storage and transfer coded media bitstream from the encoder 110 directly to the sender 130. The coded media bitstream is then transferred to the sender 130, also referred to as the server, on a need basis. The format used in the transmission may be an elementary self-contained bitstream format, a packet stream format, or one or more coded media bitstreams may be encapsulated into a container file. The encoder 110, the storage 120, and the sender 130 may reside in the same physical device or they may be included in separate devices. The encoder 110 and sender 130 may operate with live real-time content, in which case the coded media bitstream is typically not stored permanently, but rather buffered for small periods of time in the content encoder 110 and/or in the sender 130 to smooth out variations in processing delay, transfer delay, and coded media bitrate. It is also possible to use different communication protocols for different parts of the coded media bitstream. For example, the parameter set NAL units may be conveyed using the Session Description Protocol (SDP), while the remaining of the data are conveyed using RTP.

The sender 130 sends the coded media bitstream using a communication protocol stack. The stack may include but is not limited to Real-Time Transport Protocol (RTP), User Datagram Protocol (UDP), and Internet Protocol (IP). When the communication protocol stack is packet-oriented, the sender 130 encapsulates the coded media bitstream into packets. For example, when RTP is used, the sender 130 encapsulates the coded media bitstream into RTP packets according to an RTP payload format. Typically, each media type has a dedicated RTP payload format. It should again be noted that a system may contain more than one sender 130, but for the sake of simplicity, the following description only considers one sender 130.

The sender 130 may or may not be connected to a gateway 140 through a communication network. The gateway 140 may perform different types of functions, such as translation of a packet stream according to one communication protocol stack to another communication protocol stack, merging and forking of data streams, and manipulation of data streams according to the downlink and/or receiver capabilities, such as controlling the bit rate of the forwarded stream according to prevailing downlink network conditions. Examples of gateways 140 include multipoint conference control units (MCUs), gateways between circuit-switched and packet-switched video telephony, Push-to-talk over Cellular (PoC) servers, IP encapsulators in digital video broadcasting-handheld (DVB-H) systems, or set-top boxes that forward broadcast transmissions locally to home wireless networks. When RTP is used, the gateway 140 is called an RTP mixer and acts as an endpoint of an RTP connection.

Alternatively, the coded media bitstream may be transferred from the sender 130 to the receiver 150 by other means, such as storing the coded media bitstream to a portable mass memory disk or device when the disk or device is connected to the sender 130 and then connecting the disk or device to the receiver 150.

The system includes one or more receivers 150, typically capable of receiving, de-modulating, and de-capsulating the transmitted signal into a coded media bitstream. De-capsulating may include the removal of data that receivers are incapable of decoding or that is not desired to be decoded. The codec media bitstream is typically processed further by a decoder 160, whose output is one or more uncompressed media streams. Finally, a renderer 170 may reproduce the uncompressed media streams with a loudspeaker or a display, for example. The receiver 150, decoder 160, and renderer 170 may reside in the same physical device or they may be included in separate devices.

Scalability in terms of bitrate, decoding complexity, and picture size is a desirable property for heterogeneous and error prone environments. This property is desirable in order to counter limitations such as constraints on bit rate, display resolution, network throughput, and computational power in a receiving device.

In the H.264/AVC and SVC standards, an elementary coded unit for transmission is referred to as a Network Abstraction Layer (NAL) unit. In packet-oriented communication systems and storage formats, NAL units are encapsulated into transport packets and storage units, respectively. In stream-oriented communications systems and storage formats, a self-contained byte stream is formed from the NAL units of the coded video sequences by preceding each NAL unit with a start code. Each NAL unit comprises a NAL unit header and NAL unit payload. The NAL unit header indicates the type of the NAL unit and other information. The NAL unit payload includes a raw byte sequence payload (RBSP) which is modified not to contain any emulations of start codes. The structure of the RBSP is determined by the NAL unit type that contains the RBSP. An SEI RBSP contains one or more SEI messages. Each SEI message contains three fields: a SEI payload type, a SEI payload size, and a SEI payload. The SEI payload type indicates the syntax and semantics of the SEI payload. The SEI payload size indicates the size of the SEI payload (in terms of bytes). The SEI payload contains the syntax elements for the SEI payload.

Figure 4:
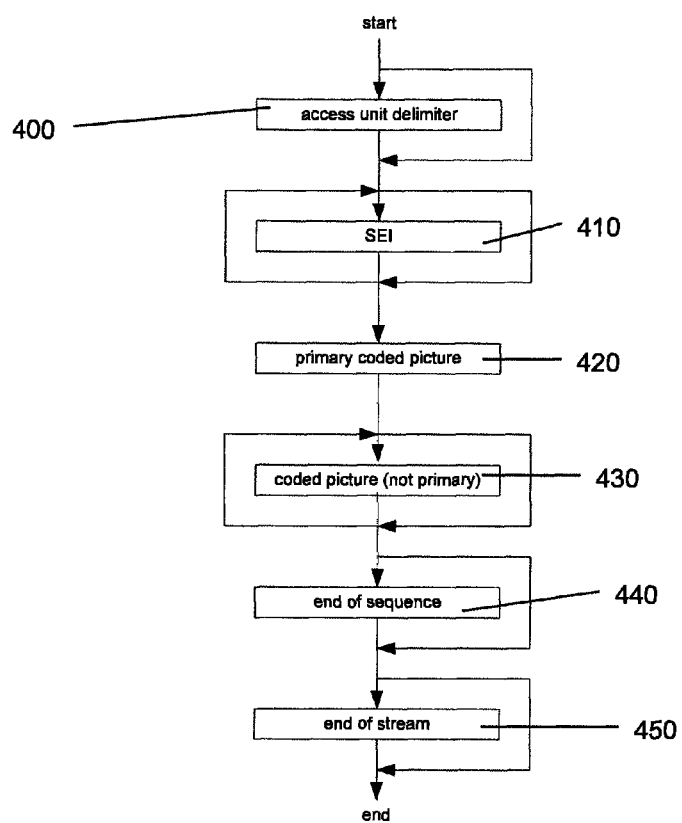
FIG. 4 is an illustration of the structure and order of elements of access units according to H.264/AVC.

FIG. 4 illustrates the structure and order of elements of access units according to H.264/AVC. As can be seen in FIG. 4, an access unit delimiter 400 is followed by a SEI 410, a primary coded picture 420 and a coded picture (not primary) 430, which are followed by an end of sequence 440 and end of stream 450, respectively. The block coded picture (not primary) 430 refers to any combination of redundant coded pictures, auxiliary coded pictures, or enhancement coded pictures. The structure for an SVC access unit is identical to the structure illustrated in FIG. 4, except for the fact that the primary coded picture (for the base layer) may not be present.

In scalable video coding, an access unit may comprise multiple coded pictures, wherein each picture is one representation of the video sequence at a certain spatial resolution, temporal resolution, at a certain quality level or some combination of the three. An access unit according to the SVC standard comprises one primary coded picture for the base layer and may contain multiple enhancement coded pictures, but at most one enhancement coded picture that is not a redundant coded picture per each unique combination of dependency_id, temporal_level, and quality_level. In other words, a combination of dependency_id, temporal_level and quality_level uniquely determines a layer in the scalable video bitstream. The unique combination of dependency_id and quality_level associated with an access unit in a scalable video bitstream according to the SVC standard uniquely determines the coded pictures of the access unit. Other unique identifiers of the pictures may also be used. Such unique identifiers may be a combination of multiple values and such values may be either explicitly conveyed in the coded bitstream or implicitly determined using any other information conveyed in the bitstream.

Figure 5:
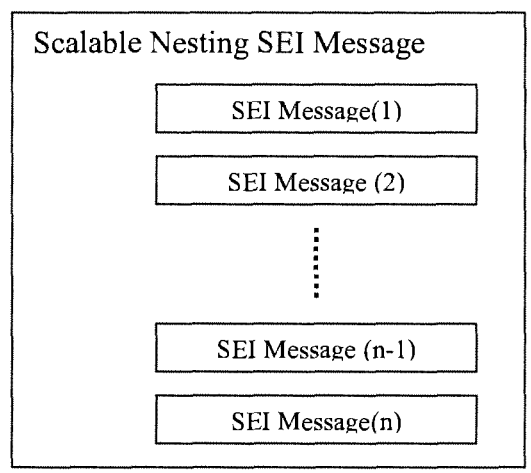
FIG. 5 is a representation of a scalable nesting SEI message constructed in accordance with one embodiment of the invention.

Various embodiments of the present invention involve the introduction of a signal in the form of a new SEI message, referred to herein as a scalable nesting SEI message. It should be understood, however, that the present invention is not intended to be limited to the term used to describe the nesting SEI message, and that a different term may also be used. A representation of a scalable nesting SEI message is depicted in FIG. 5. In one embodiment, the scalable nesting SEI message contains a nested SEI message of any type, including a further nested SEI message. In another embodiment, it may be restricted that the nested SEI message is an SEI message of any type other than another scalable nesting SEI message. The size of the contained message matches with the indicated payload size of the scalable nesting SEI message (taking into account the "header" of the scalable nesting SEI payload). The scalable nesting SEI message may include an indication, e.g., a flag such as pictures_in_au_flag, which indicates whether the nested SEI message applies to all coded pictures of an access unit at issue. If the message applies only to some of coded pictures of the access unit, then the scalable nesting SEI message contains the indication of the pictures within the access unit with which the nested SEI message is associated, e.g., values of dependency_id and quality_level of the pictures. Other unique identifiers of the pictures may also be used. Such unique identifiers may be a combination of multiple values and such values may be either explicitly conveyed in the coded bitstream or implicitly determined using any other information conveyed in the bitstream. This information, which is encoded by the encoder 110 of FIG. 1, is decoded by the decoder 160 and used to assist in processes related to decoding, display or other purposes, depending on the semantics of the nested SEI message.

The relevant syntax structures of the present invention, according to one particular embodiment, is as follows.

| sei_payload( payloadType, payloadSize ) { | C | Descriptor |
|---|---|---|
|   if( payloadType = = 0 ) | | |
|     buffering_period( payloadSize ) | 5 | |
|   else if( payloadType = = 1 ) | | |
|     pic_timing( payloadSize ) | 5 | |
|   ... | | |
|   else if( payloadType = = SCALABLE_NESTING ) | | |
|   // SCALABLE_NESTING is the next | | |
|   unallocated constant | | |
|     scalable_nesting( payloadSize ) | | |

| scalable_nesting( payloadSize ) { | C | Descriptor |
|---|---|---|
|   all_pictures_in_au_flag | 5 | u(1) |
|   if( all_pictures_in_au_flag = = 0 ) { | | |
|     num_pictures | 5 | ue(v) |
|     for( i = 0; i < num_pictures; i++ ) { | | |
|       dependency_id[ i ] | 5 | u(3) |
|       quality_level[ i ] | 5 | u(2) |
|     } | | |
|   } | | |
|   while( !byte_aligned( ) ) | | |
|     sei_nesting_zero_bit /* equal to 0 */ | 5 | f(1) |
|   sei_message( ) | | |
| } | | |

| sei_message( ) { | C | Descriptor |
|---|---|---|
|   payloadType = 0 | | |
|   while( next_bits( 8 ) = = 0xFF ) { | | |
|     ff_byte /* equal to 0xFF */ | 5 | f(8) |
|     payloadType += 255 | | |
|   } | | |
|   last_payload_type_byte | 5 | u(8) |
|   payloadType += last_payload_type_byte | | |
|   payloadSize = 0 | | |
|   while( next_bits( 8 ) = = 0xFF ) { | | |
|     ff_byte /* equal to 0xFF */ | 5 | f(8) |
|     payloadSize += 255 | | |
|   } | | |
|   last_payload_size_byte | 5 | u(8) |
|   payloadSize += last_payload_size_byte | | |
|   sei_payload( payloadType, payloadSize ) | 5 | |
| } | | |

In addition to the above, the scalable nesting SEI message may also contain a redundant_pic_cnt if it is desired to associate SEI messages to redundant pictures and an indication for auxiliary picture.

In another embodiment of the invention, the nesting SEI message may contain multiple nested SEI messages, each having the same scope, i.e., all of the multiple nested SEI messages are associated with the same pictures. In this embodiment, the syntax of the scalable_nesting syntax structure is specified in the following table. more_sei_message_data( ) is a function returning TRUE if there is more data to be parsed in the SEI message that a call to the function (i.e. the scalable nesting SEI message in this case). Otherwise, more_sei_message_data( ) returns FALSE.

| scalable_nesting( payloadSize ) { | C | Descriptor |
|---|---|---|
| all_pictures_in_au_flag | 5 | u(1) |
| if( all_pictures_in_au_flag = = 0 ) { | | |
|   num_pictures | 5 | ue(v) |
|   for( i = 0; i < num_pictures; i++ ) { | | |
|     dependency_id[ i ] | 5 | u(3) |
|     quality_level[ i ] | 5 | u(2) |
|   } | | |
| } | | |
| while( !byte_aligned( ) ) | | |
|   sei_nesting_zero_bit /* equal to 0 */ | 5 | f(1) |
| sei_message( ) | | |
| while( more_sei_message_data( ) ) | | |
|   sei_message( ) | | |
| } | | |

In addition to the scalable nesting SEI message, the semantics of each SEI message of H.264/AVC may be redefined to include semantics of the message when used within the scalable nesting SEI message. The semantics of some messages, such as the pan-scan rectangle SEI message, can be generalized to be associated with certain enhancement coded pictures too. In general, the semantics of any H.264/AVC SEI message may be re-defined to address all of the pictures in the scope identified by the scalable nesting SEI message. This is in contrast to the semantics specified by H.264/AVC, which typically address only the primary coded pictures for which the message pertains. For example, when a scalable nesting SEI message contains an SEI message, such as the motion-constrained slice-group set SEI message, that pertains to all access units in a coded video sequence but only to certain pictures of these access units having the same unique indication, e.g., dependency_id and quality_level (for example, it would typically be contained in the first access unit which contains the pictures it applies). If it is desirable that a particular SEI message pertains to pictures having a certain value of temporal_level, the SEI message would typically be contained in the first access unit to which the message is applied and contains pictures having the desired temporal_level. According to the SVC specification, the primary coded picture and the enhancement coded pictures in an access unit have the same value of temporal_level. If it is desirable that a particular SEI message pertains to pictures having a certain range of temporal_level values, the SEI message syntax may contain a mechanism to indicate the range of temporal_level values, or the range can be derived from the temporal_level of the pictures contained in the same access unit as the SEI message.

In one embodiment of the invention, the semantics of a particular SEI message of H.264/AVC, namely the spare picture SEI message, may be defined as follows when used within the scalable nesting SEI message: When the spare picture SEI message is included in a scalable nesting SEI message, the message is applicable when the target picture and the spare picture defined below are decoded from the NAL units with nal_unit_type in the range of 1 to 5, inclusive, and the NAL units with nal_unit_type equal to 20 or 21 and for which the dependency_id is among dependency_id[i] and quality_level is among quality_level[i]. This SEI message indicates that certain slice group map units, referred to as spare slice group map units, in one or more decoded reference pictures resemble the co-located slice group map units in a specified decoded picture called the target picture. A spare slice group map unit may be used to replace a co-located, incorrectly decoded slice group map unit in the target picture. A decoded picture containing spare slice group map units is referred to as a spare picture.

Relevant syntax structures according to another embodiment of the invention involving MVC are as follows:

| scalable_nesting( payloadSize ) { | C | Descriptor |
|---|---|---|
| all_pictures_in_au_flag | 5 | u(1) |
| if( all_pictures_in_au_flag = = 0 ) { | | |
|   num_pictures | 5 | ue(v) |
|   for( i = 0; i < num_pictures; i++ ) | | |
|     view_id[ i ] | 5 | u(10) |
| } | | |
| while( !byte_aligned( ) ) | | |
|   sei_nesting_zero_bit /* equal to 0 */ | 5 | f(1) |
| sei_message( ) | | |
| } | | |

In this syntax, view_id[i] indicates the identifier of the view to which the i-th picture belongs. Other syntax elements have the same semantics as in the embodiments discussed previously. Other unique identifiers of the pictures belonging to a view may also be used.

Relevant syntax structures according to yet another embodiment of the invention involving MDC are as follows:

| scalable_nesting( payloadSize ) { | C | Descriptor |
|---|---|---|
| all_pictures_in_au_flag | 5 | u(1) |
| if( all_pictures_in_au_flag = = 0 ) { | | |
|   num_pictures | 5 | ue(v) |
|   for( i = 0; i < num_pictures; i++ ) | | |
|     description_id[ i ] | 5 | u(8) |
| } | | |
| while( !byte_aligned( ) ) | | |
|   sei_nesting_zero_bit /* equal to 0 */ | 5 | f(1) |
| sei_message( ) | | |
| } | | |

In the above syntax, description_id[i] indicates the identifier of the MDC description to which the i-th picture belongs. Other syntax elements have the same semantics as in the first embodiment described previously. Other unique identifiers of the pictures belonging to a MDC description may also be used.

Relevant syntax structures according to a further embodiment of the invention involving a combination of SVC and MVC are as follows:

| scalable_nesting( payloadSize ) { | C | Descriptor |
|---|---|---|
| all_pictures_in_au_flag | 5 | u(1) |
| if( all_pictures_in_au_flag = = 0 ) { | | |
|   num_pictures | 5 | ue(v) |
|   for( i = 0; i < num_pictures; i++ ) { | | |
|     dependency_id[ i ] | 5 | u(3) |
|     quality_level[ i ] | 5 | u(2) |

-continued

| scalable_nesting( payloadSize ) { | C | Descriptor |
|---|---|---|
|     view_id[ i ] | 5 | u(10) |
|   } |  |  |
| } |  |  |
| while( !byte_aligned( ) ) |  |  |
|   sei_nesting_zero_bit /* equal to 0 */ | 5 | f(1) |
| sei_message( ) |  |  |
| } |  |  |

In the above syntax, view_id[i] indicates the identifier of the view to which the i-th picture belongs. Other syntax elements have the same semantics as in the first embodiment described previously. Other unique identifiers of the pictures belonging to a scalable layer and view may also be used.

Relevant syntax structures according to yet another embodiment of the invention involving a combination of SVC, MVC and MDC are as follows:

| scalable_nesting( payloadSize ) { | C | Descriptor |
|---|---|---|
|   all_pictures_in_au_flag | 5 | u(1) |
|   if( all_pictures_in_au_flag = = 0) { |  |  |
|     num_pictures | 5 | ue(v) |
|     for( i = 0; i < num_pictures; i++ ) { |  |  |
|       dependency_id[ i ] | 5 | u(3) |
|       quality_level[ i ] | 5 | u(2) |
|       view_id[ i ] | 5 | u(10) |
|       description_id[ i ] | 5 | u(8) |
|     } |  |  |
|   } |  |  |
| while( !byte_aligned( ) ) |  |  |
|   sei_nesting_zero_bit /* equal to 0 */ | 5 | f(1) |
| sei_message( ) |  |  |
| } |  |  |

In the above syntax, view_id[i] indicates the identifier of the view to which the i-th picture belongs description_id[i] indicates the identifier of the MDC description to which the i-th picture belongs. Other syntax elements have the same semantics as in the first embodiment described previously. Other unique identifiers of the pictures belonging to a scalable layer, view and MDC description may also be used.

Figure 2:
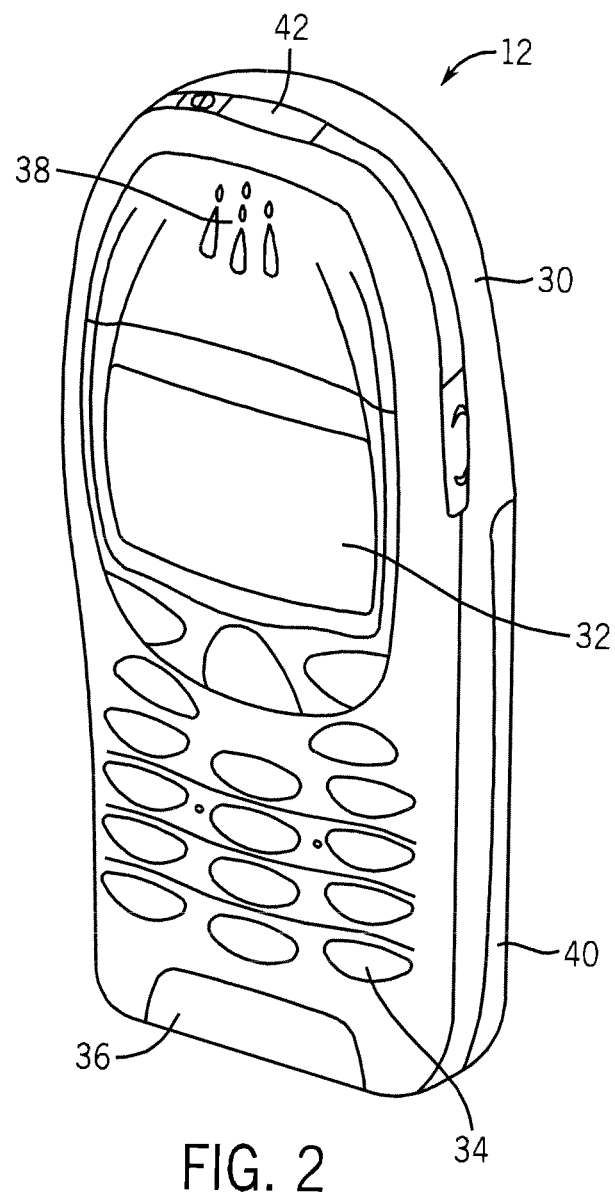
FIG. 2 is a perspective view of a mobile telephone that can be used in the implementation of the present invention.
Figure 3:
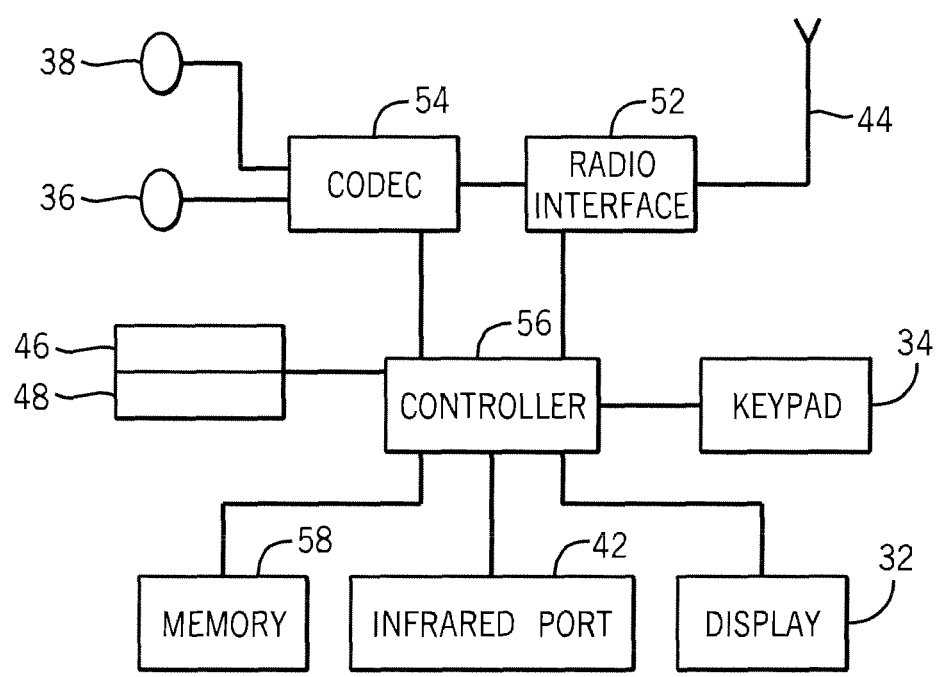
FIG. 3 is a schematic representation of the circuitry of the mobile telephone of FIG. 2.

FIGS. 2 and 3 show one representative mobile telephone 12 within which the present invention may be implemented. It should be understood, however, that the present invention is not intended to be limited to one particular type of mobile telephone 12 or other electronic device. Some or all of the features depicted in FIGS. 2 and 3 could be incorporated into any or all of the devices represented in FIG. 1.

The mobile telephone 12 of FIGS. 2 and 3 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile telephones.

Communication devices of the present invention may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device may communicate using various media including, but not limited to, radio, infrared, laser, cable connection, and the like.

The present invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method, comprising:
    encoding a plurality of pictures into an access unit in a video bitstream;
    encoding a first indication associated with the access unit, wherein the first indication comprises a nesting supplemental enhancement information (SEI) message; and
    encoding at least one message associated with the first indication, the first indication indicating a plurality of encoded pictures in the access unit to which the at least one message applies, wherein the at least one message comprises any SEI message other than a nesting SEI message.

2. The method of claim 1, wherein the video bitstream is a scalable video bitstream.

3. The method of claim 2, wherein the first indication includes dependency_id and quality_level values.

4. The method of claim 1, wherein the nesting SEI message further includes a third indication associating the nested SEI message to at least one redundant coded picture.

5. The method of claim 1, wherein the first indication comprises a second indication indicating that the at least one message applies to all encoded pictures in the access unit.

6. The method of claim 1, wherein the first indication indicates whether the at least one message applies to either only some of the encoded pictures in the access unit or to all of the encoded pictures in the access unit.

7. The method of claim 1, wherein the video bitstream comprises a multi-view video bitstream.

8. The method of claim 7, wherein the first indication includes a View_id value.

9. The method of claim 1, wherein the video bitstream comprises a multiple description bitstream.

10. The method of claim 9, wherein the first indication includes a description_id value.

11. The method of claim 1, wherein the video bitstream comprises a combination scalable video and multiview video bitstream.

12. The method of claim 1, wherein the video bitstream comprises a combination scalable video, multiview video and multiple description bitstream.

13. A computer program product, embodied in a non-transitory computer-readable storage medium storing computer-executable instructions that, when executed by an apparatus, cause the apparatus to perform the method of claim 1.

14. An apparatus, comprising:
a processor; and
a memory unit communicatively connected to the processor and including computer code that, when executed by the apparatus, causes the apparatus to:
encode a plurality of pictures into an access unit of a video bitstream;
encode a first indication associated with the access unit, wherein the first indication comprises a nesting supplemental enhancement information (SEI) message; and
encode at least one message associated with the first indication, the first indication indicating a plurality of encoded pictures in the access unit to which the at least one message applies, wherein the at least one message comprises any SEI message other than a nesting SEI message.

15. The apparatus of claim 14, wherein the video bitstream is a scalable video bitstream.

16. The apparatus of claim 14, wherein the first indication comprises a second indication indicating whether the at least one message applies to either only some encoded pictures in the access unit or all encoded pictures in the access unit.

17. The apparatus of claim 15, wherein the first indication indicates whether the at least one message applies to either only some of the encoded pictures in the access unit or to all of the encoded pictures in the access unit.

18. The apparatus of claim 14, wherein the video bitstream comprises a multiple description bitstream.

19. The apparatus of claim 14, wherein the video bitstream comprises a combination scalable video and multiview video bitstream.

20. The apparatus of claim 14, wherein the video bitstream comprises a multi-view video bitstream.

21. The apparatus of claim 14, wherein the video bitstream comprises a combination scalable video, multiview video and multiple description bitstream.

22. A method, comprising:
decoding a first indication associated with an access unit in a video bitstream, wherein the first indication comprises a nesting supplemental enhancement information (SEI) message;
processing at least one message associated with the first indication, the first indication indicating a plurality of encoded pictures in the access unit to which the at least one message applies, wherein the at least one message comprises any SEI message other than a nesting SEI message; and
processing from the bitstream the plurality of pictures from the access unit in accordance with the processed first indication.

23. The method of claim 22, wherein the video bitstream is a scalable video bitstream.

24. The method of claim 22, wherein the nesting SEI message further includes a third indication associating the nested SEI message to at least one redundant coded picture.

25. The method of claim 22, wherein the first indication indicates whether the at least one message applies to either only some encoded pictures in the access unit or all of the encoded pictures in the access unit.

26. The method of claim 22, wherein the first indication further indicates which encoded pictures within the access unit the at least one message is associated with.

27. The method of claim 22, wherein the first indication includes dependency_id and quality_level values.

28. The method of claim 22, wherein the video bitstream comprises a multi-view video bitstream.

29. The method of claim 28, wherein the first indication includes a view_id value.

30. The method of claim 22, wherein the video bitstream comprises a multiple description bitstream.

31. The method of claim 30, wherein the first indication includes a description_id value.

32. The method of claim 22, wherein the video bitstream comprises a combination scalable video and multiview video bitstream.

33. The method of claim 22, wherein the video bitstream comprises a combination scalable video, multiview video and multiple description bitstream.

34. A computer program product, embodied in a non-transitory computer-readable storage medium storing computer-executable instructions that, when executed by an apparatus, cause the apparatus to perform the method of claim 22.

35. An apparatus, comprising:
a processor; and
a memory unit communicatively connected to the processor and including computer code that, when executed by the apparatus, causes the apparatus to:
decode a first indication associated with an access unit of a video bitstream, wherein the first indication comprises a nesting supplemental enhancement information (SEI) message;
process at least one message associated with the first indication, the first indication indicating a plurality of encoded pictures in the access unit to which the at least one message applies, wherein the at least one message comprises any SEI message other than a nesting SEI message; and
process from the bitstream the plurality of pictures from the access unit in accordance with the processed first indication.

36. The apparatus of claim 35, wherein the video bitstream is a scalable video bitstream.

37. The apparatus of claim 35, wherein the first indication indicates whether the at least one message applies to either only some encoded pictures in the access unit or all of the encoded pictures in the access unit.

38. The apparatus of claim 35, wherein the first indication further indicates which encoded pictures within the access unit the at least one message is associated with.

39. The apparatus of claim 35, wherein the video bitstream comprises a multi-view video bitstream.

40. The apparatus of claim 35, wherein the video bitstream comprises a multiple description bitstream.

41. The apparatus of claim 35, wherein the video bitstream comprises a combination scalable video and multiview video bitstream.

42. The apparatus of claim 35, wherein the video bitstream comprises a combination scalable video, multiview video and multiple description bitstream.

* * * * *

UNITED STATES PATENT AND TRADEMARK OFFICE
CERTIFICATE OF CORRECTION

PATENT NO. : 8,699,583 B2
APPLICATION NO. : 11/736492
DATED : April 15, 2014
INVENTOR(S) : Hannuksela et al.

It is certified that error appears in the above-identified patent and that said Letters Patent is hereby corrected as shown below:

In the claims:

Column 13,
Line 43, Claim 17, "claim 15" should read --claim 14--.

Signed and Sealed this
Fifth Day of August, 2014

Michelle K. Lee
*Deputy Director of the United States Patent and Trademark Office*